(12) United States Patent  (10) Patent No.: US 9,064,513 B1
Pan et al.  (45) Date of Patent: Jun. 23, 2015

(54) DISK DRIVE SUSPENSION ASSEMBLY WITH FLEXURE HAVING DUAL CONDUCTIVE LAYERS WITH STAGGERED TRACES

(71) Applicant: Western Digital Technologies, Inc., Irvine, CA (US)

(72) Inventors: Tzong-Shii Pan, San Jose, CA (US); Cliff Zhang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/278,316

(22) Filed: May 15, 2014

Related U.S. Application Data (60) Provisional application No. 61/949,409, filed on Mar. 7, 2014.

(51) Int. Cl.
    *G11B 5/48* (2006.01)
(52) U.S. Cl.
    CPC ..................................... *G11B 5/486* (2013.01)
(58) Field of Classification Search
    USPC ..................................................... 360/245.9
    See application file for complete search history.

(56) References Cited

U.S. PATENT DOCUMENTS

| | | |
|---|---|---|
| 4,819,094 A | 4/1989 | Oberg |
| 4,845,311 A | 7/1989 | Schreiber et al. |
| 5,717,547 A | 2/1998 | Young |
| 5,737,152 A | 4/1998 | Balakrishnan |
| 5,754,369 A | 5/1998 | Balakrishnan |
| 5,805,382 A | 9/1998 | Lee et al. |
| 5,812,344 A | 9/1998 | Balakrishnan |
| 5,862,010 A | 1/1999 | Simmons et al. |
| 5,995,328 A | 11/1999 | Balakrishnan |
| 6,038,102 A | 3/2000 | Balakrishnan et al. |
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,219,202 B1 | 4/2001 | Palmer |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |

(Continued)

*Primary Examiner* — Mark Blouin (57) ABSTRACT

A disk drive suspension assembly has a load beam and a laminated flexure attached to the load beam. The laminated flexure includes a structural layer with a head mounting tongue, and first and second conductive layers. A first dielectric layer is disposed between the structural layer and the first conductive layer, and a second dielectric layer is disposed between the first conductive layer and the second conductive layer. The first conductive layer includes a first plurality of adjacent traces, and the second conductive layer includes a second plurality of adjacent traces that are staggered relative to the first plurality of adjacent traces. The adjacent traces of each plurality are electrically common and joined at a distal junction adjacent the head mounting tongue and joined at a proximal junction at the flexure tail terminal region.

20 Claims, 5 Drawing Sheets

(56) References Cited

U.S. PATENT DOCUMENTS

| | | |
|---|---|---|
| 6,339,518 B1 | 1/2002 | Chang et al. |
| 6,349,017 B1 | 2/2002 | Schott |
| 6,369,987 B1 | 4/2002 | Khan et al. |
| 6,373,660 B1 | 4/2002 | Lam et al. |
| 6,378,195 B1 | 4/2002 | Carlson |
| 6,414,820 B1 | 7/2002 | Coon et al. |
| 6,487,048 B1 | 11/2002 | Dunn |
| 6,522,504 B1 | 2/2003 | Casey |
| 6,538,850 B1 | 3/2003 | Hadian et al. |
| 6,583,953 B1 | 6/2003 | Han et al. |
| 6,608,736 B1 | 8/2003 | Klaassen et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,700,748 B1 | 3/2004 | Cowles et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,900,967 B1 | 5/2005 | Coon et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 6,975,488 B1 | 12/2005 | Kulangara et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,286,325 B2 | 10/2007 | Hernandez et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,325,294 B2 | 2/2008 | Zhou |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,832,082 B1 | 11/2010 | Hentges et al. |
| 7,986,494 B2 | 7/2011 | Pro |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,094,413 B1 | 1/2012 | Hentges et al. |
| 8,111,483 B2 | 2/2012 | Arai |
| 8,154,827 B2 | 4/2012 | Contreras et al. |
| 8,164,858 B1 | 4/2012 | Moravec et al. |
| 8,169,746 B1 | 5/2012 | Rice et al. |
| 8,199,437 B1 | 6/2012 | Sun et al. |
| 8,208,224 B1 | 6/2012 | Teo et al. |
| 8,218,268 B1 | 7/2012 | Pan |
| 8,233,240 B2 | 7/2012 | Contreras et al. |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,422,171 B1 * | 4/2013 | Guerini ............... 360/244.1 |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,467,153 B1 * | 6/2013 | Pan et al. ............ 360/264.2 |
| 8,477,459 B1 * | 7/2013 | Pan ..................... 360/245.9 |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 * | 12/2013 | Pan et al. ............ 360/264.2 |
| 8,623,197 B1 | 1/2014 | Kobsiriphat et al. |
| 8,624,184 B1 | 1/2014 | Souza et al. |
| 8,665,566 B1 * | 3/2014 | Pan et al. ............ 360/264.2 |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,702,998 B1 * | 4/2014 | Guerini ..................... 216/13 |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 8,879,212 B1 | 11/2014 | Huber |
| 2004/0252413 A1 | 12/2004 | Nishiyama |
| 2006/0044695 A1 | 3/2006 | Erpelding |
| 2006/0173343 A1 | 8/2006 | Guo et al. |
| 2011/0019311 A1 | 1/2011 | Greminger et al. |
| 2011/0157750 A1 | 6/2011 | Zhu et al. |
| 2012/0160538 A1 | 6/2012 | Contreras et al. |
| 2012/0160548 A1 | 6/2012 | Contreras et al. |
| 2013/0244541 A1 | 9/2013 | Yaemglin et al. |
| 2013/0293982 A1 | 11/2013 | Huber |

* cited by examiner

FIG. 5 ern magnetic hard disk drive device, each head is a sub-component of a head gimbal assembly (HGA) that typically includes a suspension assembly with a laminated flexure to carry the electrical signals to and from the head. The HGA, in turn, is a sub-component of a head stack assembly (HSA) that typically includes a plurality of HGAs, an actuator, and a flexible printed circuit. The plurality of HGAs are attached to various arms of the actuator, and each of the laminated flexures of the HGAs has a flexure tail that is electrically connected to the HSA's flexible printed circuit.

Modern laminated flexures typically include conductive copper traces that are isolated from a stainless steel structural layer by a polyimide dielectric layer. So that the signals from/to the head can reach the flex cable on the actuator body, each HGA flexure includes a flexure tail that extends away from the head along the actuator arm and ultimately attaches to the flexible printed circuit adjacent the actuator body. That is, the flexure includes traces that extend from adjacent the head and terminate at electrical connection points at the flexible printed circuit. The flexible printed circuit includes electrical conduits that correspond to the electrical connection points of the flexure tail.

Since the conductive traces of the flexure are separated from the structural layer by a dielectric layer, electrical capacitance exists between the conductive traces and the structural layer. Electrical capacitance also exists between one conductive trace and another adjacent conductive trace. Such electrical capacitances affect the capacitive reactance and impedance of the conductive traces, and hence the bandwidth of the conductive traces.

Heat Assisted Magnetic Recording (HAMR) uses a pulsed laser diode as a heat source on the head. In HAMR applications, the conductive traces connecting the head and the preamplifier of the flexible printed circuit of the HSA require at least two high bandwidth transmission paths: the magnetic write path and the pulsed laser path. Other conductive traces may carry signals from the read transducer (e.g. a tunneling magneto-resistive sensor), a head-based microactuator, and/or a resistive heater for dynamic flying height control. Hence, there is a need in the art for a flexure design that can provide required transmission paths on the flexure tail for modern HAMR or non-HAMR applications, without the flexure tail becoming too wide, and with the transmission paths having adequately high bandwidth without excessive crosstalk or excessive impedance.

DETAILED DESCRIPTION OF EXAMPLE EMBODIMENTS

Figure 1:
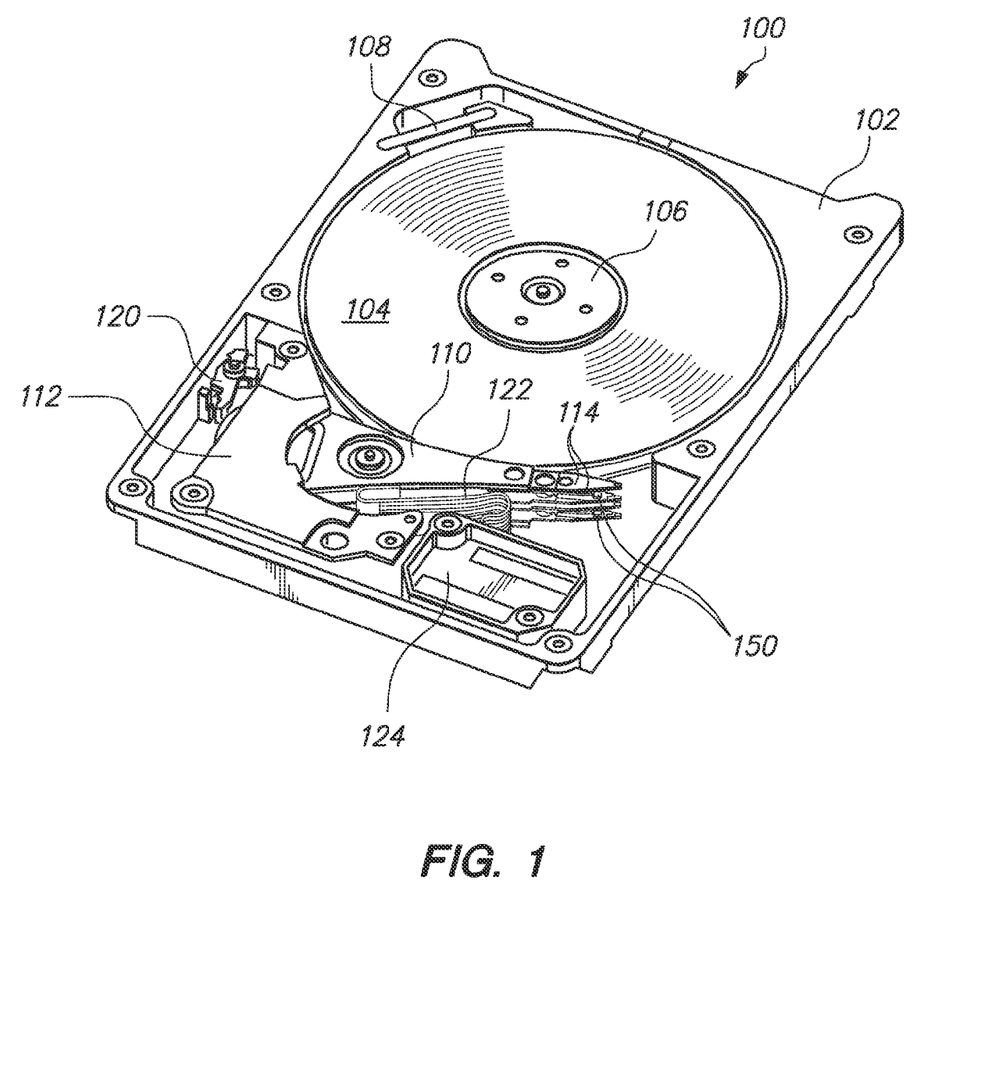
FIG. 1 is a top perspective view of a disk drive capable of including an embodiment of the present invention.

FIG. 1 is a top perspective view of a disk drive 100 capable of including an embodiment of the present invention. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 110 that is pivotably mounted on disk drive base 102. Voice coil motor 112 rotates the actuator 110 through a limited angular range so that at least one head gimbal assembly (HGA) 114 is desirably positioned relative to one or more tracks of information on a corresponding one of the disks 104. In the embodiment of FIG. 1, the actuator 110 includes three arms upon which four HGAs 114 are attached, each corresponding to a surface of one of the two disks 104. However in other embodiments fewer or more HGAs may be included depending on the number of disks 104 that are included and whether the disk drive 100 is depopulated. Each HGA 114 includes a head 150 for reading and writing data from and to one of the disks 104. The actuator 110 may occasionally be latched at an extreme angular position within the limited angular range, by latch 120. Electrical signals to/from the HGAs 114 are carried to other drive electronics via a flexible printed circuit (FPC) that includes a flex cable 122 (preferably including a preamplifier circuit) and flex cable bracket 124.

Figure 2A:
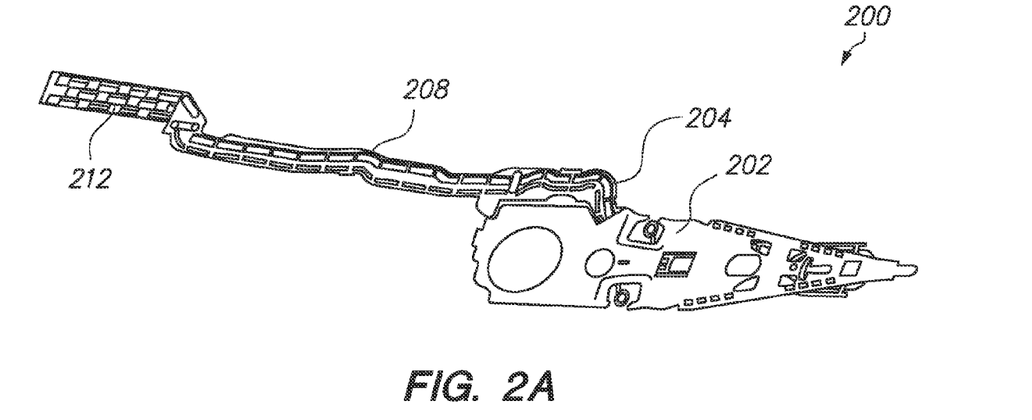
FIG. 2A is a top perspective view of a suspension assembly capable of including an embodiment of the present invention.
Figure 2B:
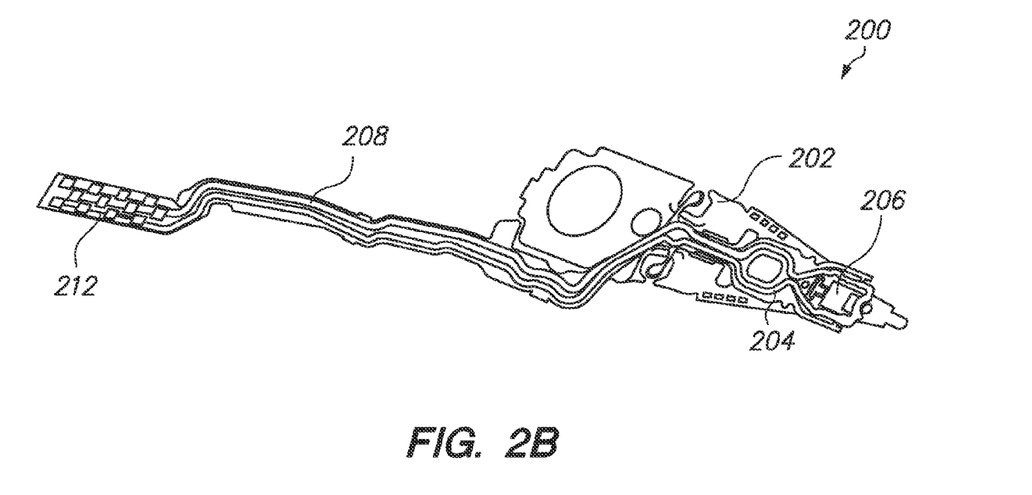
FIG. 2B is a bottom perspective view of the suspension assembly of FIG. 2A.

FIGS. 2A and 2B depict the top and underside, respectively, of a suspension assembly 200 capable of including an embodiment of the present invention. Now referring additionally to FIGS. 2A and 2B, the suspension assembly 200 is designed to support a head (e.g. head 150) after it is assembled into a HGA. However, before assembly into an HGA, the suspension assembly 200 does not include a head, and suspension assemblies may be manufactured and sold without including a head. The suspension assembly 200 includes a load beam 202. A purpose of the load beam 202, once the suspension assembly 200 is included in a HGA, is to provide vertical compliance for the head 150 to follow vertical undulation of the surface of a disk 104 as it rotates, and to preload the head 150 against the surface of the disk 104 as it rotates, by a preload force that is commonly referred to as the "gram load."

The suspension assembly 200 also includes a laminated flexure 204 attached to the load beam 202. For example, a structural layer of the laminated flexure 204 may be spot welded to the load beam 202. When the suspension assembly 200 is included in a HGA, the head 150 is attached to a head mounting surface of a tongue 206 of the laminated flexure 204. A first purpose of the laminated flexure 204 is to provide compliance for the head 150 to follow pitch and roll angular undulations of the surface of disk 104 as it rotates, while restricting relative motion between the head 150 and the load beam 202 in the lateral direction and about a yaw axis. A second purpose of the laminated flexure 204 is to provide a plurality of electrical paths to the head 150 to facilitate signal transmission to/from the head 150.

For that second purpose, the laminated flexure 204 may include a plurality of electrically conductive (e.g. copper) traces. So that the signals from/to the head 150 can reach the flex cable 122 adjacent the actuator 110, the laminated flexure 204 may include a flexure tail 208 that extends away from the head 150 along the actuator 110 and ultimately connects to the flex cable 122 adjacent the actuator 110. That is, the laminated flexure 204 may include conductive traces that extend from adjacent the head 150 and terminate at electrical connection points at a terminus region 212 of the flexure tail 208. As seen from FIGS. 1, 2A, and 2B, the flexure tail 208 is a distinct and smaller component, as compared with flex cable 122. Methods of electrical connection of the flexure tail 208 to the flex cable 122 include ultrasonic tab bonding, solder reflow, anisotropic conductive film (ACF) bonding, or solder jet bond (SJB).

Figure 3:
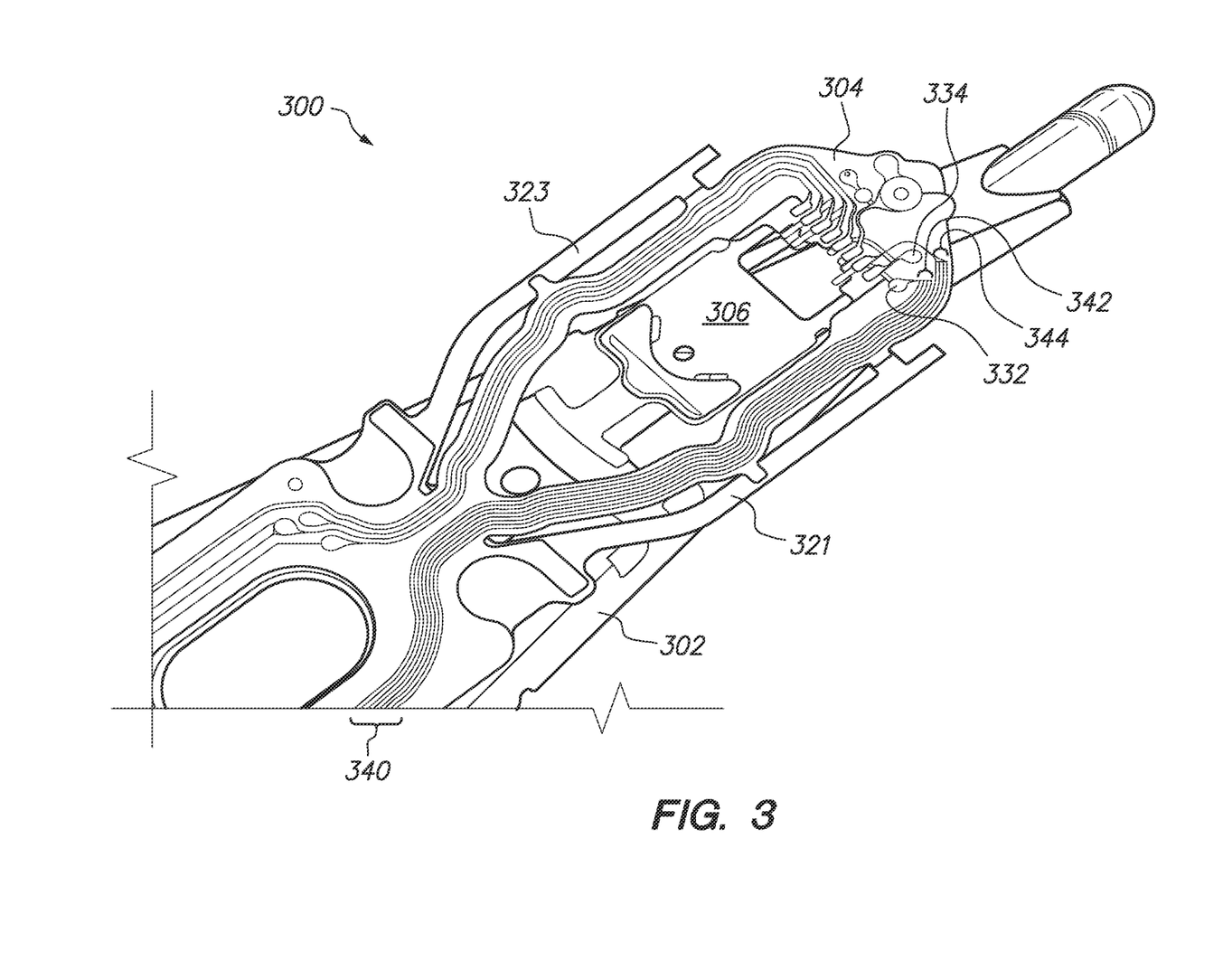
FIG. 3 is a perspective view of a distal region of a suspension assembly according to an embodiment of the present invention.

FIG. 3 is a perspective view of a distal region of a suspension assembly 300 according to an embodiment of the present invention. The suspension assembly 300 includes a laminated flexure 304 attached to a suspension load beam 302. The laminated flexure 304 includes a structural layer that includes two outrigger beams 321, 323. The laminated flexure 304 includes a tongue 306 having a head mounting surface. The laminated flexure 304 also includes a plurality of conductive traces 340 defined in a conductive layer that is electrically separated from the structural layer by a dielectric layer. The laminated flexure 304 may also include a plurality of conductive vias 332, 334 through which the plurality of conductive layers may be connected to traces in an underlying layer and/or to each other. The conductive vias 332, 334 may comprise a conductive metal such as copper or gold, for example. Also, an optional insulative cover layer may cover the uppermost layer of conductive traces 340 except where their terminals must be exposed for electrical connection to the head.

Fewer vias are required if the traces are not interleaved, although interleaving can reduce the impedance and increase the bandwidth of a transmission line. In the present context, a transmission line is considered to be "interleaved" if it includes a first conductor that is split into a first group of common conductors, each being connected in parallel at both the proximate and distal ends of the transmission line, and if it also includes a second conductor that is split into a second group of common conductors, each being connected in parallel at both the proximate and distal ends of the transmission line, and if those of the first group of common conductors are interspersed between those of the second group of common conductors without shorting with (being directly connected to) the second group of common conductors. However, such interspersing requires the number of vias to increase as the number of common conductors (from the split) is increased. That may be undesirable in certain applications.

In the embodiment of FIG. 3, a first plurality of adjacent traces 342 are electrically common and joined at a first distal junction (adjacent via 332) adjacent the head mounting tongue 306. Likewise, a second plurality of adjacent traces 344 are electrically common and joined at a second distal junction (adjacent via 334) adjacent the head mounting tongue 306. Note that in this configuration only a single via 332 is needed for the entire first group of traces 342 regardless of how many parallel traces belong to that group. That is, in the embodiment shown in FIG. 3, the group 342 of adjacent conductive traces requires only a single via 332 for electrical connection to a trace in an underlying conductive layer, regardless of how many adjacent traces belong to the group 342. By contrast, in an interleaved configuration, the more parallel traces each line is divided into, the more vias are needed to connect them.

Figure 4:
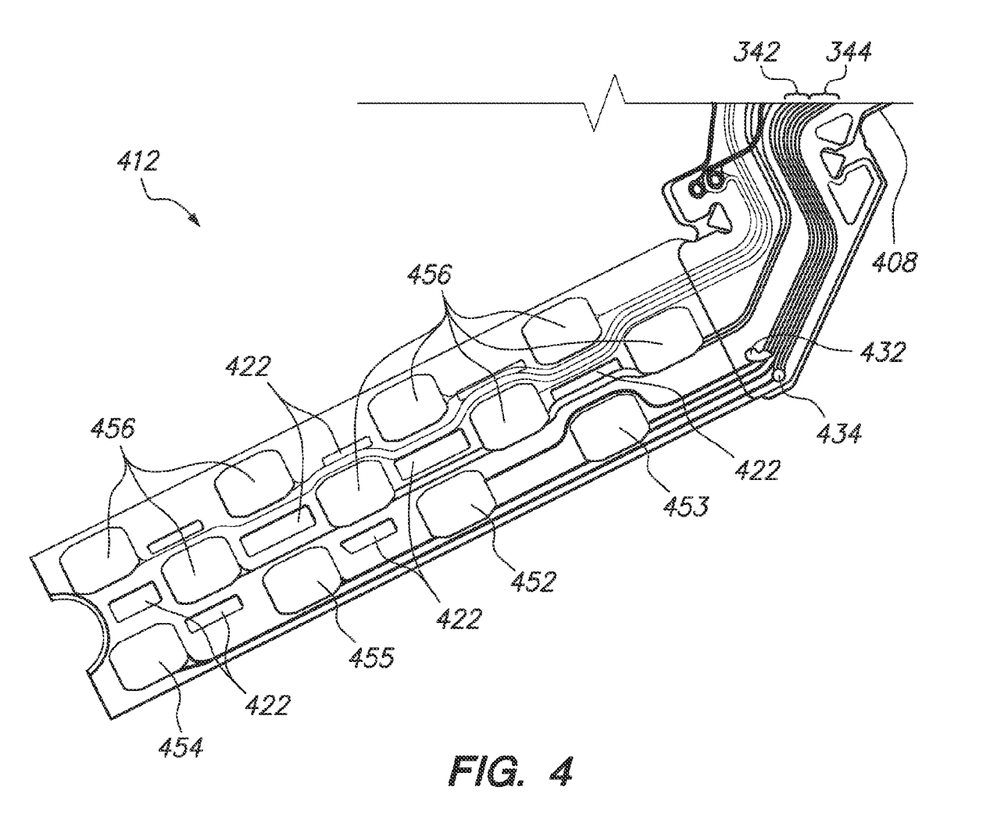
FIG. 4 is a plan view of a terminal region of a laminated flexure tail according to an embodiment of the present invention.

FIG. 4 is a plan view of a terminal region 412 of a laminated flexure tail 408 according to an embodiment of the present invention. The laminated flexure tail 408 includes conductive traces which may correspond to the conductive traces 340 of FIG. 3 in certain embodiments. For example, as shown in FIG. 4, the first plurality of adjacent traces 342 are joined at a first proximal junction 432 (which may also be a via through one or more underlying dielectric layers) at the flexure tail terminal region 412. Likewise, the second plurality of adjacent traces 344 are joined at a second proximal junction 434 (which may also be a via through one or more underlying dielectric layers) at the flexure tail terminal region 412.

In the embodiment of FIG. 4, the flexure tail terminal region 412 includes a plurality of flexure bond pads 452, 453, 454, 455, 456 that are configured to be aligned with and connected to corresponding ones of a plurality of FPC bond pads (e.g. of the flex cable 122 of FIG. 1). A dielectric layer of the flexure tail terminal region 412 may also optionally include a plurality of through openings 422, for example to control the spread of ACF material used to make electrical connections to the flexure bond pads 452, 453, 454, 455, 456. The first plurality of adjacent traces 342 may be optionally electrically connected in common to flexure bond pad 452, for example, and the second plurality of adjacent traces 344 may be optionally electrically connected in common to flexure bond pad 454, for example. However, many other arrangements and connections may be made in the flexure tail terminal region 412.

Figure 5:
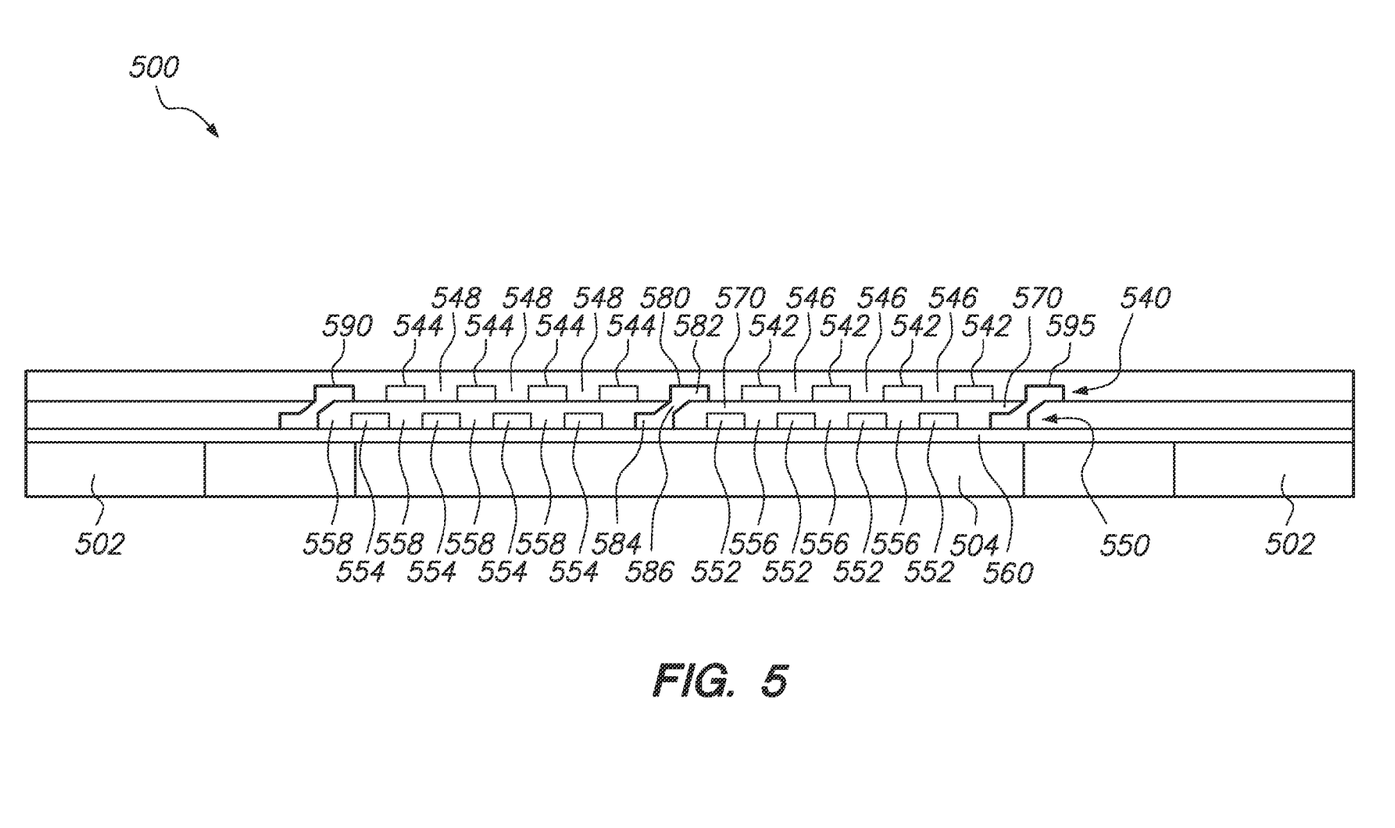
FIG. 5 is a cross-sectional view of a laminated flexure according to an embodiment of the present invention.

FIG. 5 is a cross-sectional view of a laminated flexure 500 at a midpoint along an adjacent actuator arm, according to an embodiment of the present invention. The laminated flexure tail 500 includes a structural layer 502, which may comprise stainless steel and have a thickness in the range of 10 microns to 20 microns, for example. A first conductive layer 550 includes a first plurality of adjacent traces 552. A second conductive layer 540 includes a second plurality of adjacent traces 542 that are staggered relative to the first plurality of adjacent traces 552. In certain embodiments, each of the first and second conductive layers 550, 540 may comprise copper and may preferably have a thickness in the range of 2.5 microns to 18 microns.

In this context, staggered means that the first plurality of adjacent traces 552 are separated by a first plurality of lateral intertrace spacings 556, and the second plurality of adjacent traces 542 are separated by a second plurality of lateral intertrace spacings 546, with the second plurality of adjacent traces 542 partially or completely overlying the first plurality of lateral intertrace spacings 556, and the second plurality of intertrace spacings 546 partly or completely overlying the first plurality of adjacent traces 552. In the foregoing context, to "overlie" does not imply direct contact, but rather that the largest major surface of an upper conductive trace overlaps with the lateral spacing or gap between two of the lower row of conductive traces, while being vertically spaced by a dielectric material.

As a result of the staggering of one layer of conductive traces relative to the other shown in FIG. 5, each single-layer group of traces may see the other layer, which is laterally offset, as a slotted ground plane. In certain embodiments, this can advantageously increase isolation between the two corresponding high bandwidth signal paths without adding additional metallic layers. Therefore, with only two conductive trace layers, one may obtain two high bandwidth signal paths, without necessarily having an additional ground plane layer.

In certain embodiments, each of the first plurality of adjacent traces 552, and each of the first plurality of lateral intertrace spacings 556, may preferably have a lateral width in the range of 5 microns to 30 microns. Likewise, in certain embodiments, each of the second plurality of adjacent traces 542, and each of the second plurality of lateral intertrace spacings 546, may preferably have a lateral width in the range of 5 microns to 30 microns. Note that although in FIG. 5 the widths of the adjacent traces are shown to be equal, they need not be. In certain embodiments, unequal widths may be preferred.

Note that not all of the traces defined (e.g. by etching/patterning) in the first conductive layer 550 need belong to the first plurality of adjacent traces 552, or any other plurality defined herein. There may be other traces defined in the first conductive layer 550 that do not pertain to any plurality defined herein. Likewise, not all of the traces defined (e.g. by etching/patterning) in the second conductive layer 540 need belong to the second plurality of adjacent traces 542, or any other plurality defined herein. There may be other traces defined in the second conductive layer 540 that do not pertain to any plurality defined herein.

In the embodiment of FIG. 5, the outgoing and return traces are not interleaved but rather are grouped, with one group of adjacent traces 542 of common polarity above (and staggered relative to) the other group 552 below. Such arrangement can reduce the number of necessary vias through the dialectric layer, relative to an interleaved configuration. In certain embodiments, the configuration described in the preceding paragraphs may reduce impedance and/or advantageously reduce the difference of line-to-ground capacitive coupling, which may result in lower transmitted signal distortions and enhanced common-mode noise suppression.

In certain embodiments, the structural layer may optionally include a window 504 therethrough, with the window 504 underlying the first plurality of adjacent traces 552. In this context, the window 504 is considered to underlie the first plurality of adjacent traces 552, even if the window 504 does not underlie the entire length of the first plurality of adjacent traces 552 (e.g. even if the structural layer 502 includes a plurality of windows 504, each underlying only a partial segment of the first plurality of adjacent traces 552, with the windows 504 being separated by regions where the structural layer 502 does not have a window underlying the first plurality of adjacent traces 552). In certain embodiments, the window 504 through the structural layer 502 may provide desired electrical characteristics and thereby enable higher bandwidth signal transmission, for example by reducing electrical capacitance between the first plurality of adjacent traces 552 and the structural layer 502.

In the embodiment of FIG. 5, a first dielectric layer 560 is disposed between the structural layer 502 and the first conductive layer 550. A second dielectric layer 570 is disposed between the first conductive layer 550 and the second conductive layer 540. In certain embodiments, each of the first and second dielectric layers 560, 570 may comprise polyimide and may preferably have a thickness in the range of 5 microns to 25 microns.

In the embodiment of FIG. 5, the first conductive layer 550 further includes a third plurality of adjacent traces 554, and the second conductive layer 540 further includes a fourth plurality of adjacent traces 544 that are staggered relative to the third plurality of adjacent traces 554. In certain embodiments, the first and second pluralities of adjacent traces 552, 542 may optionally together carry a writing signal to the head, and the third and fourth pluralities of adjacent traces 554, 544 may optionally together carry a laser diode driving signal to the head.

In this context, staggered means that the third plurality of adjacent traces 554 are separated by a third plurality of lateral intertrace spacings 558, and the fourth plurality of adjacent traces 544 are separated by a fourth plurality of lateral intertrace spacings 548, with the fourth plurality of adjacent traces 544 at least partially overlying the third plurality of lateral intertrace spacings 558, and the fourth plurality of intertrace spacings 548 at least partially overlying the third plurality of adjacent traces 554.

In the foregoing context, to "overlie" does not imply direct contact, but rather may mean that the largest major surface of an upper conductive trace overlaps with the lateral spacing or gap between two of the lower row of conductive traces, while being vertically spaced by a dielectric material. In certain embodiments, the configuration of traces, spacings, and dielectric layers described herein may provide substantial advantages in terms of electrical properties, such as balancing the capacitance of each trace with respect to the structural layer, changing intertrace capacitance, increasing bandwidth, and electromagnetic noise shielding and common mode rejection or cancellation.

In the embodiment of FIG. 5, the first and second pluralities of adjacent traces 552, 542 are separated from the third and fourth pluralities of adjacent traces 554, 544 by a conductive shielding wall 580 that may be grounded to the structural layer 502. In certain embodiments the conductive shielding wall 580 includes a first shielding trace 584 defined in the first conductive layer 550 and a second shielding trace 582 defined in the second conductive layer 540, and a plurality of conductive shielding vias 586 through the second dielectric layer 570 that electrically connect the first shielding trace 584 to the second shielding trace 582.

In certain embodiments, the plurality of shielding vias 586 may be optionally spaced one from another along the flexure tail 500 by a longitudinal inter-via spacing that may be chosen based on the expected upper frequency limit of the signals carried by the conductive traces. For example, in certain embodiments, if the signal bandwidth is approximately 6 GHz, then the vias optionally may not be longitudinally spaced more than 3 mm from each other. In other embodiments with marginally lower bandwidth, the longitudinal spacing of the shielding vias optionally may not exceed 4 mm. In this context, longitudinal denotes a direction along the length of the flexure tail 500 (in or out of the paper in the view of FIG. 5).

Optionally, additional conductive shielding walls 590, 595 may be included in the flexure tail 500, for example disposed laterally outside of the pluralities of conductive traces (as shown in FIG. 5). The additional conductive shielding walls 590, 595 may also be grounded to the structural layer 502. In certain embodiments, the conductive shielding wall 580 may beneficially reduce cross-talk issues and the additional conductive shielding walls 590, 595 may advantageously reduce electromagnetic emissions.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
a disk drive base,
an actuator including an actuator arm that extends from an actuator body that is pivotably attached to the disk drive base; and
a head gimbal assembly (HGA) attached to a distal end of the actuator arm, the HGA including a head, and a suspension assembly that comprises a load beam and a laminated flexure attached to the load beam, the laminated flexure including a head mounting tongue to which the head is bonded, and a flexure tail extending along the actuator arm to a flexure tail terminal region at the actuator body, the flexure tail including
a structural layer;
a first conductive layer including a first plurality of adjacent traces, and a second conductive layer including a second plurality of adjacent traces that are staggered relative to the first plurality of adjacent traces; and
a first dielectric layer disposed between the structural layer and the first conductive layer, and a second dielectric layer disposed between the first conductive layer and the second conductive layer;
wherein the first plurality of adjacent traces are electrically common and joined at a first distal junction adjacent the head mounting tongue and joined at a first proximal junction at the flexure tail terminal region, and wherein the second plurality of adjacent traces are electrically common and joined at a second distal junction adjacent the head mounting tongue and joined at a second proximal junction at the flexure tail terminal region.

2. The disk drive of claim 1 wherein the first plurality of adjacent traces are separated from each other along the actuator arm by a first plurality of lateral intertrace spacings, and the second plurality of adjacent traces are separated from each other along the actuator arm by a second plurality of lateral intertrace spacings, with the second plurality of adjacent traces overlying the first plurality of lateral intertrace spacings, and the second plurality of intertrace spacings overlying the first plurality of adjacent traces.

3. The disk drive of claim 1 wherein the structural layer further includes a window therethrough, and the window underlies the first plurality of adjacent traces.

4. The disk drive of claim 1 wherein the second distal junction includes a conductive via through the second dielectric layer.

5. The disk drive of claim 1 wherein the second proximal junction includes a conductive via through the second dielectric layer.

6. The disk drive of claim 1 wherein the first conductive layer further includes a third plurality of adjacent traces, and the second conductive layer further includes a fourth plurality of adjacent traces that are staggered relative to the third plurality of adjacent traces.

7. The disk drive of claim 6 wherein the third plurality of adjacent traces are separated from each other along the actuator arm by a third plurality of lateral intertrace spacings, and the fourth plurality of adjacent traces are separated from each other along the actuator arm by a fourth plurality of lateral intertrace spacings, with the fourth plurality of adjacent traces overlying the third plurality of lateral intertrace spacings, and the fourth plurality of intertrace spacings overlying the third plurality of adjacent traces.

8. The disk drive of claim 6 wherein the first and second pluralities of adjacent traces together carry a writing signal to the head, and the third and fourth pluralities of adjacent traces together carry a laser diode driving signal to the head.

9. The disk drive of claim 6 wherein the first and second pluralities of adjacent traces are separated from the third and fourth pluralities of adjacent traces by a conductive shielding wall that is grounded to the structural layer.

10. The disk drive of claim 9 wherein the conductive shielding wall includes a first shielding trace defined in the first conductive layer and a second shielding trace defined in the second conductive layer, and a plurality of conductive shielding vias through the second dielectric layer that electrically connect the first shielding trace to the second shielding trace, the plurality of shielding vias being spaced one from another along the flexure tail by an inter-via spacing that does not exceed 4 mm.

11. A suspension assembly comprising:
a load beam; and
a laminated flexure attached to the load beam, the laminated flexure including a head mounting tongue to which the head is bonded, and a flexure tail extending away from the head mounting tongue to a flexure tail terminal region at the actuator body, the flexure tail including
a structural layer;
a first conductive layer including a first plurality of adjacent traces, and a second conductive layer including a second plurality of adjacent traces that are staggered relative to the first plurality of adjacent traces; and
a first dielectric layer disposed between the structural layer and the first conductive layer, and a second dielectric layer disposed between the first conductive layer and the second conductive layer;
wherein the first plurality of adjacent traces are electrically common and joined at a first distal junction adjacent the head mounting tongue and joined at a first proximal junction at the flexure tail terminal region, and wherein the second plurality of adjacent traces are electrically common and joined at a second distal junction adjacent the head mounting tongue and joined at a second proximal junction at the flexure tail terminal region.

12. The suspension assembly of claim 11 wherein the first plurality of adjacent traces are separated from each other by a first plurality of lateral intertrace spacings, and the second plurality of adjacent traces are separated from each other by a second plurality of lateral intertrace spacings, with the second plurality of adjacent traces overlying the first plurality of lateral intertrace spacings, and the second plurality of intertrace spacings overlying the first plurality of adjacent traces.

13. The suspension assembly of claim 11 wherein the structural layer further includes a window therethrough, and the window underlies the first plurality of adjacent traces.

14. The suspension assembly of claim 1 wherein the second distal junction includes a conductive via through the second dielectric layer.

15. The suspension assembly of claim 11 wherein the second proximal junction includes a conductive via through the second dielectric layer.

16. The suspension assembly of claim 11 wherein the first conductive layer further includes a third plurality of adjacent traces, and the second conductive layer further includes a fourth plurality of adjacent traces that are staggered relative to the third plurality of adjacent traces.

17. The suspension assembly of claim 16 wherein the third plurality of adjacent traces are separated from each other by a third plurality of lateral intertrace spacings, and the fourth plurality of adjacent traces are separated from each other by a fourth plurality of lateral intertrace spacings, with the fourth plurality of adjacent traces overlying the third plurality of lateral intertrace spacings, and the fourth plurality of intertrace spacings overlying the third plurality of adjacent traces.

18. The suspension assembly of claim 16 wherein the first and second pluralities of adjacent traces are separated from the third and fourth pluralities of adjacent traces by a conductive shielding wall that is grounded to the structural layer.

19. The suspension assembly of claim 18 wherein the conductive shielding wall includes a first shielding trace defined in the first conductive layer and a second shielding trace defined in the second conductive layer, and a plurality of conductive shielding vias through the second dielectric layer that electrically connect the first shielding trace to the second shielding trace, the plurality of shielding vias being spaced one from another along the flexure tail by an inter-via spacing that does not exceed 4 mm.

20. A head gimbal assembly (HGA) comprising:
a head; and
a suspension assembly that comprises a load beam and a laminated flexure attached to the load beam, the laminated flexure including a head mounting tongue to which the head is bonded, and a flexure tail extending away from the head mounting tongue to a flexure tail terminal region at the actuator body, the flexure tail including
a structural layer;
a first conductive layer including a first plurality of adjacent traces, and a second conductive layer including a second plurality of adjacent traces that are staggered relative to the first plurality of adjacent traces; and
a first dielectric layer disposed between the structural layer and the first conductive layer, and a second dielectric layer disposed between the first conductive layer and the second conductive layer;
wherein the first plurality of adjacent traces are electrically common and joined at a first distal junction adjacent the head mounting tongue and joined at a first proximal junction at the flexure tail terminal region, and wherein the second plurality of adjacent traces are electrically common and joined at a second distal junction adjacent the head mounting tongue and joined at a second proximal junction at the flexure tail terminal region.

* * * * *